(12) United States Patent
Wang

(10) Patent No.: US 12,415,328 B2
(45) Date of Patent: Sep. 16, 2025

(54) FOUR SIDE SEAL PACKAGING BAG AND PREPARATION DEVICE AND METHOD THEREOF

(71) Applicant: SHANGHAI ZHOUTAI LIGHT INDUSTRY MACHINERY MANUFACTURING CO., LTD., Shanghai (CN)

(72) Inventor: Jian Wang, Shanghai (CN)

(73) Assignee: SHANGHAI ZHOUTAI LIGHT INDUSTRY MACHINERY MANUFACTURING CO., LTD., Shanghai (CN)

( * ) Notice: Subject to any disclaimer, the term of this patent is extended or adjusted under 35 U.S.C. 154(b) by 0 days.

(21) Appl. No.: 18/889,492

(22) Filed: Sep. 19, 2024

(65) Prior Publication Data

US 2025/0010568 A1   Jan. 9, 2025

Related U.S. Application Data

(63) Continuation of application No. PCT/CN2023/091935, filed on May 2, 2023.

(30) Foreign Application Priority Data

Dec. 30, 2022   (CN) .......................... 202211720824.7

(51) Int. Cl.
*B31B 70/14* (2017.01)
*B31B 70/26* (2017.01)
(Continued)

(52) U.S. Cl.
CPC .......... *B31B 70/148* (2017.08); *B31B 70/266* (2017.08); *B31B 70/8133* (2017.08);
(Continued)

(58) Field of Classification Search
CPC . B31B 70/148; B31B 70/266; B31B 70/8133; B31B 70/16; B31B 70/645; B31B 2170/30; B31B 2155/0012
See application file for complete search history.

(56) References Cited

U.S. PATENT DOCUMENTS 2,090,308 A * 8/1937 Potdevin ................. B31B 70/00
493/232
2,788,720 A * 4/1957 Browning ............... B31B 70/79
156/203
(Continued)

FOREIGN PATENT DOCUMENTS

CN   103909680 A   7/2014
CN   205238550 U   5/2016
(Continued)

*Primary Examiner* — Joshua G Kotis
(74) *Attorney, Agent, or Firm* — Bayramoglu Law Offices LLC

(57) ABSTRACT

The provided are a four side seal packaging bag and a preparation device and method thereof. The preparation device includes at least: a film material conveying mechanism, configured to continuously convey a film material of a packaging bag along a length direction of the film material; a folding mechanism, configured to fold the film material conveyed by the film material conveying mechanism; a cutting mechanism, configured to cut the upper film material; punch-and-cut mechanisms, configured to form square punch-and-cut regions and separate the square punch-and-cut regions from the side accordion film materials; a side accordion forming mechanism, configured to perform a forming operation on the side accordion film materials; and a hot-sealing mechanism, configured to hot-seal the upper film material, the formed side accordion film materials, and the lower film material.

17 Claims, 7 Drawing Sheets

(51) Int. Cl.
*B31B 70/64* (2017.01)
*B31B 70/81* (2017.01)
*B31B 155/00* (2017.01)
*B31B 170/30* (2017.01)
*B65D 33/25* (2006.01)

(52) U.S. Cl.
CPC ........ *B65D 33/2508* (2013.01); *B31B 70/645* (2017.08); *B31B 2155/0012* (2017.08); *B31B 2170/30* (2017.08)

(56) References Cited

U.S. PATENT DOCUMENTS

| | | | |
|---|---|---|---|
| 8,414,465 B2 * | 4/2013 | Totani | B65D 31/10 |
| | | | 493/243 |
| 2004/0092375 A1 | 5/2004 | Pansier et al. | |
| 2004/0258332 A1 | 12/2004 | Totani et al. | |
| 2010/0290722 A1 * | 11/2010 | DeSmedt | B31B 70/00 |
| | | | 493/264 |
| 2010/0310195 A1 * | 12/2010 | Miller | B65D 33/2525 |
| | | | 493/267 |
| 2011/0077139 A1 * | 3/2011 | Kujat | B31B 70/8133 |
| | | | 493/267 |
| 2012/0196731 A1 * | 8/2012 | Sargin | B65D 33/22 |
| | | | 493/227 |
| 2014/0187401 A1 * | 7/2014 | Totani | B31B 50/64 |
| | | | 493/196 |

FOREIGN PATENT DOCUMENTS

| | | | | |
|---|---|---|---|---|
| CN | 106494000 A | | 3/2017 | |
| CN | 110435218 B | * | 7/2021 | ............ B31B 70/00 |
| CN | 202210102401.2 | | 1/2022 | |
| CN | 202210120014.1 | | 1/2022 | |
| DE | 3408722 A1 | * | 6/1985 | ............ B65D 31/10 |
| DE | 3703757 A1 | * | 8/1988 | ............ B31B 70/00 |
| EP | 1795335 A2 | | 6/2007 | |
| EP | 2868466 A1 | * | 5/2015 | ............ B65D 31/10 |
| JP | H1059387 A | | 3/1998 | |
| JP | H11300855 A | | 11/1999 | |
| JP | 2003170510 A | | 6/2003 | |
| WO | WO-2008120062 A2 | * | 10/2008 | ........... B65B 61/188 |

* cited by examiner

FOUR SIDE SEAL PACKAGING BAG AND PREPARATION DEVICE AND METHOD THEREOF

CROSS-REFERENCE TO THE RELATED APPLICATIONS

This application is a continuation application of International Application No. PCT/CN2023/091935, filed on May 2, 2023, which is based upon and claims priority to Chinese Patent Application No. 202211720824.7, filed on Dec. 30, 2022, the entire contents of which are incorporated herein by reference.

TECHNICAL FIELD

The present disclosure relates to the field of packaging bag processing machinery, and in particular, to a four side seal packaging bag and a preparation device and method thereof.

BACKGROUND

Packaging bags, which refer to bags for packaging various products, are widely used in daily life and industrial production to facilitate the conveyance and storage of items during production and circulation processes. A four side seal packaging bag mainly includes upper and lower film materials, and two side accordion film materials located between the upper and lower film materials.

The applicant has been committed to research and development in the preparation of four side seal packaging bags. The applicant has submitted to the China National Intellectual Property Administration (CNIPA) on Jan. 27, 2022 the Chinese patent application 202210102401.2, titled "FOUR SIDE SEAL PACKAGING BAG AND PREPARATION DEVICE THEREOF", and the Chinese patent application 202210120014.1, titled "PREPARATION METHOD OF FOUR SIDE SEAL PACKAGING BAG". Through repeated experimentation and research, the applicant has made further optimization and improvement on these solutions.

SUMMARY

A technical problem to be solved by a technical solution of the present disclosure is to provide a four side seal packaging bag and a preparation device and method thereof.

The present disclosure provides a preparation device of a four side seal packaging bag, including at least:
- a film material conveying mechanism, configured to continuously convey a film material of a packaging bag along a length direction of the film material;
- a folding mechanism, configured to fold the film material conveyed by the film material conveying mechanism so as to form an upper film material, a lower film material, and two side accordion film materials of the packaging bag, thereby forming a basic structure of the four side seal packaging bag;
- a cutting mechanism, configured to cut the upper film material formed by folding by the folding mechanism, along creases, so as to separate the upper film material from the lower film material and the side accordion film materials;
- punch-and-cut mechanisms, configured to form square punch-and-cut regions on the side accordion film materials separated from the upper film material and separate the square punch-and-cut regions from the side accordion film materials;
- a side accordion forming mechanism, configured to perform a forming operation on the side accordion film materials after the square punch-and-cut regions are separated by the punch-and-cut mechanism; and
- a hot-sealing mechanism, configured to hot-seal the upper film material, the formed side accordion film materials, and the lower film material to form the four side seal packaging bag.

Further, the film material folded by the folding mechanism is a one-piece structure; and the folding mechanism is configured to: fold the film material at a side and a center line of the film material upwards along a conveying direction of the film material; fold the film material back to form two fold angles, thereby forming the side accordion film materials; and fold, after two fold angles are formed at the center line, the folded-back film material upwards to cover upper sides of the two side accordion film materials, thereby forming the upper film material, where an unfolded film material part at a bottom forms the lower film material.

Further, there are at least two punch-and-cut mechanisms; and the two punch-and-cut mechanisms are symmetrically arranged at the side accordion film materials at two sides of the upper film material, to form the square punch-and-cut regions of the two side accordion film materials, respectively.

Further, the punch-and-cut mechanisms each are provided with at least a punch-proof structure; the punch-proof structure is provided with at least a punch-proof pad and a punch-proof pad insertion structure; and the punch-proof pad is inserted between the side accordion film material and the lower film material through the punch-proof pad insertion structure, to prevent damage to the lower film material caused when the punch-and-cut mechanism punches and cuts off the square punch-and-cut region of the side accordion film material.

Further, the punch-and-cut mechanisms each are provided with at least a roll-to-cut structure; the roll-to-cut structure is provided with at least rolling cutters and a rolling cutter drive component; the rolling cutter drive component is connected to the rolling cutters to control roll-to-cut operation of the rolling cutters; the rolling cutters are located above the side accordion film material; and the rolling cutters roll-to-cut the side accordion film material in a direction perpendicular to the conveying direction of the side accordion film material, so as to form punch-and-cut edges of the square punch-and-cut region.

Further, the punch-and-cut mechanisms each are further provided with at least a punching structure; the punching structure is located downstream of the roll-to-cut structure and is provided with at least a punching head and a punching drive structure; and the punching head is configured to punch and cut off the square punch-and-cut region with the punch-and-cut edges through the punching drive structure, thereby forming the square punch-and-cut region independent of the side accordion film material.

Further, the punching head is a straight punching head; a length of the punching head is equal to a distance between the two punch-and-cut edges of the square punch-and-cut region; and during a punching operation, the punching head is located at a connection between the side accordion film material and a side edge of the lower film material, as well as above the side accordion film material.

Further, the punch-and-cut mechanisms each are further provided with at least a gripping structure; the gripping structure is located downstream of the punching structure and is provided with at least a gripping end and a gripping end drive structure; and the gripping end is driven by the gripping end drive structure to grip the square punch-and-cut region punched and cut by the punching head.

Further, the side accordion forming mechanism includes an angle folding mechanism; and the angle folding mechanism is located at two sides of the conveying direction of the film material, and is configured to fold, after the square punch-and-cut region is separated, the side accordion film material along a 45° angle straight line of the punch-and-cut edge, such that the punch-and-cut edge coincides with a side in a length direction of the side accordion after being folded and a right-angled triangle is formed at the side accordion film material.

Further, the side accordion forming mechanism includes at least a seal strip conveying mechanism and the hot-sealing mechanism; the seal strip conveying mechanism is configured to feed, after the square punch-and-cut region is separated, a seal strip to the side accordion film material along a direction perpendicular to the conveying direction of the film material to cover the punch-and-cut edge; and the hot-sealing mechanism is configured to hot-press the seal strip against the side accordion film material.

Further, the side accordion forming mechanism is provided with either of the angle folding mechanism and the seal strip conveying mechanism.

Further, the preparation device further includes a zipper conveying mechanism for conveying a zipper to a position between the lower film material and the upper film material.

Further, the zipper conveyed by the zipper conveying mechanism is located in a zone of the lower film material corresponding to the original square punch-and-cut region and above the triangle formed by the side accordion forming mechanism or the hot-pressed seal strip.

Further, the preparation device further includes a guiding mechanism; the guiding mechanism is located downstream of the cutting mechanism, and is configured to guide the upper film material cut by the cutting mechanism into another film material conveying mechanism for continuous conveyance in a same direction as the lower film material, and guide the upper film material to merge with the lower film material during final forming of the packaging bag.

The present disclosure provides a preparation method of a four side seal packaging bag, implemented by the preparation device of a four side seal packaging bag, and specifically including the following steps:

step 1: continuously conveying, by the film material conveying mechanism, the film material of the packaging bag along the length direction of the film material;

step 2: folding, by the folding mechanism, the film material conveyed by the film material conveying mechanism to form the upper film material, the lower film material, and the two side accordion film materials, thereby forming a basic structure of the four side seal packaging bag;

step 3: cutting, by the cutting mechanism, the upper film material formed by folding by the folding mechanism along creases, such that the upper film material is separated from the lower film material and the side accordion film materials;

step 4: guiding, by the guiding mechanism, the upper film material cut by the cutting mechanism into another film material conveying mechanism for continuous conveyance in the same direction as the lower film material;

step 5: forming, by the punch-and-cut mechanisms, the square punch-and-cut regions on the side accordion film materials separated from the upper film material, and separating the square punch-and-cut regions from the side accordion film materials;

step 6: performing, by the side accordion forming mechanism, a forming operation on the side accordion film materials after the square punch-and-cut regions are separated;

step 7: guiding, by the guiding mechanism, the upper film material with an upper side of the lower film material; and step 8: hot-sealing, by the hot-sealing mechanism, the upper film material, the formed side accordion film materials, and the lower film material to form the four side seal packaging bag.

Further, in the step 2, the film material folded by the folding mechanism is a one-piece structure; and the folding mechanism is configured to: fold the film material at a side and a center line of the film material upwards along a conveying direction of the film material; fold the film material back to form two fold angles, thereby forming the side accordion film materials; and fold, after two fold angles are formed at the center line, the folded-back film material upwards to cover upper sides of the two side accordion film materials, thereby forming the upper film material, where an unfolded film material part at a bottom forms the lower film material.

Further, in the step 5, specifically, the square punch-and-cut region is formed by at least:

step 5a: when the side accordion film material enters a station for forming the square punch-and-cut region: inserting, by the punch-proof pad insertion structure of the punch-proof structure, the punch-proof pad between the side accordion film material and the lower film material, so as to prevent damage to the lower film material when the square punch-and-cut region of the side accordion film material is punched and cut off;

step 5b: after the placement of the punch-proof pad is finished in the step 5a: starting the rolling cutter drive component of the roll-to-cut structure, and driving the rolling cutters to process the side accordion film material above the punch-proof pad, thereby forming the punch-and-cut edges of the square punch-and-cut region;

step 5c: after the punch-and-cut edges are formed in the step 5b: conveying the side accordion film material to a punching station; driving, by the punching drive structure of the punching structure, the punching head to punch and cut off the square punch-and-cut region with the punch-and-cut edges, thereby forming the square punch-and-cut region independent of the side accordion film material; and step 5d: after the square punch-and-cut region is punched and cut off in the step 5c: conveying the side accordion film material to a gripping station; driving, by the gripping end drive structure of the gripping structure, the gripping end to grip the punched and cut square punch-and-cut region to a waste disposal site for centralized recycling and processing.

Further, in the step 5b, the roll-to-cut structure is provided with at least rolling cutters; the rolling cutters are located above the side accordion film material; and the rolling cutters roll-to-cut the side accordion film material in a direction perpendicular to the conveying direction of the side accordion film material, so as to form punch-and-cut edges of the square punch-and-cut region.

Further, in the step 5c, the punching head is a straight punching head; a length of the punching head is equal to a distance between the two punch-and-cut edges of the square punch-and-cut region; and during a punching operation, the punching head is located at a connection between the side accordion film material and a side edge of the lower film material, as well as above the side accordion film material.

Further, in the step 6, the forming of the side accordion includes at least: folding, after the square punch-and-cut region is separated, the side accordion film material along the 45° angle straight line of the punch-and-cut edge, such that the punch-and-cut edge coincides with the side in the length direction of the side accordion after being folded and a triangle is formed at one end of the side accordion film material.

Further, in the step 6, the forming of the side accordion includes at least: feeding, by the seal strip conveying mechanism after the square punch-and-cut region is separated, the seal strip to the side accordion film material along the direction perpendicular to the conveying direction of the film material to cover the punch-and-cut edge; and hot-pressing, by the hot-sealing mechanism, the seal strip against the side accordion film material.

Further, in the step 6, the forming of the side accordion optionally includes either of the angle folding step and the seal strip conveying step.

Further, before guiding the upper film material to merge with the lower film material in the step 7 after the forming of the side accordion film material in the step 6, the preparation method further includes a zipper mounting step: conveying, by the zipper conveying mechanism, the zipper to the lower film material.

Further, the zipper is located in a zone of the lower film material corresponding to the original square punch-and-cut region and above a triangle formed after the forming of the side accordion or the hot-pressed seal strip.

The present disclosure further provides a four side seal packaging bag, prepared by the above preparation device and method of a four side seal packaging bag, and including at least the upper film material, the lower film material, and the two side accordion film materials located between the upper film material and the lower film material; and the zipper is located above the side accordion film materials between the upper film material and the lower film material;

the side accordion film materials include at least two structures; in one structure, a triangle structure is formed at a side of the side accordion film material located at an opening of the packaging bag; and in the other structure, the side accordion film material is a square structure provided with a seal strip structure formed by hot-pressing; and the zipper is located above the triangle structure or the seal strip structure of the side accordion film material.

In the present disclosure, the four side seal packaging bag and the preparation device and method thereof have the following technical effects:

(1) In the technical solution, the setting of first forming a punching zone on the original film of the packaging bag during the formation of the side accordion is changed. That is, the formation process of the punch-and-cut region is carried out after the separation of the upper film material, effectively ensuring the accuracy of the formation position of the punch-and-cut region and avoiding problems such as easy flanging of the film material during conveyance after punching in the original design.

(2) The preparation device is in a centralized form, effectively reducing the volume and occupied area of the device after mounting.

(3) The operation can be completed easily and quickly by the same station or adjacent stations upstream and downstream.

(4) The side accordion forming device effectively ensures the sealing of the side accordion.

(5) The same preparation device can prepare two forms of four side seal packaging bags, effectively saving the preparation process. The technical solution features a high degree of mechanization, convenient operation, and a wide range of applications.

BRIEF DESCRIPTION OF THE DRAWINGS

In order to make the objectives, features, and effects of the present disclosure fully understood, the concepts, specific structures and technical effects of the present disclosure are clearly and completely described below in conjunction with the drawings.

Figure 1:
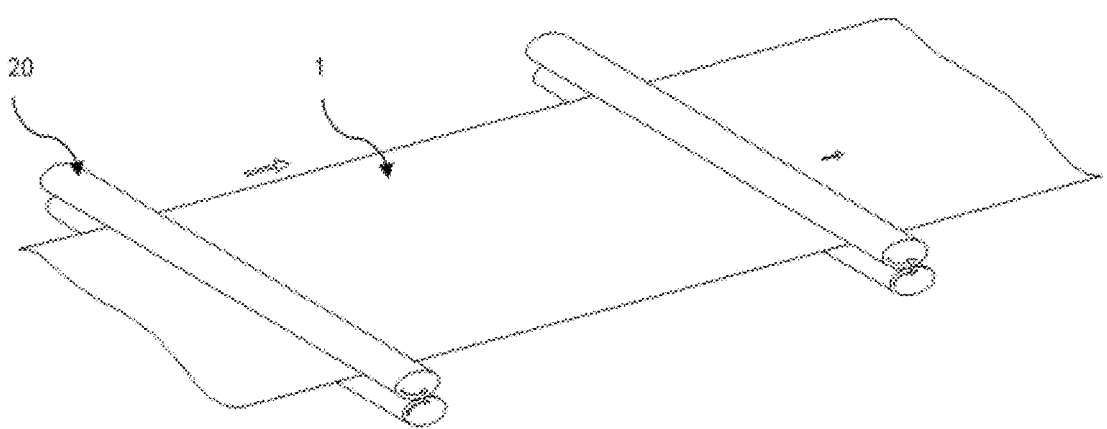
FIG. 1 is a schematic diagram of a film material conveying process according to an embodiment of the present disclosure.

REFERENCE NUMERALS 1. film material; 10. packaging bag; 11. upper film material; 12. lower film material; 13. side accordion film material; 130. triangle; 131. seal strip; 132. square punch-and-cut region; 1320. punch-and-cut edge A; 1321. punch-and-cut edge B; and 14. zipper; and 20. film material conveying mechanism; 21. cutting mechanism; 22. guiding mechanism; 23. hot-sealing mechanism; 24. punch-and-cut mechanism; 240. punch-proof pad; 241. rolling cutter; 242. punching structure; 2420. mounting seat; 2421. punching drive structure; and 2422. opening.

In the figures, the arrow indicates a movement direction of the film material of the packaging bag.

DETAILED DESCRIPTION OF THE EMBODIMENTS

The following clearly and completely describes the technical solutions in the embodiments of the present disclosure with reference to the embodiments of the present disclosure. Apparently, the described embodiments are merely a part rather than all of the embodiments of the present disclosure.

All other embodiments obtained by those of ordinary skill in the art based on the embodiments of the present disclosure without creative efforts shall fall within the protection scope of the present disclosure.

The technical solutions of the present disclosure are described below with reference to the embodiments.

Embodiment 1

Figure 2:
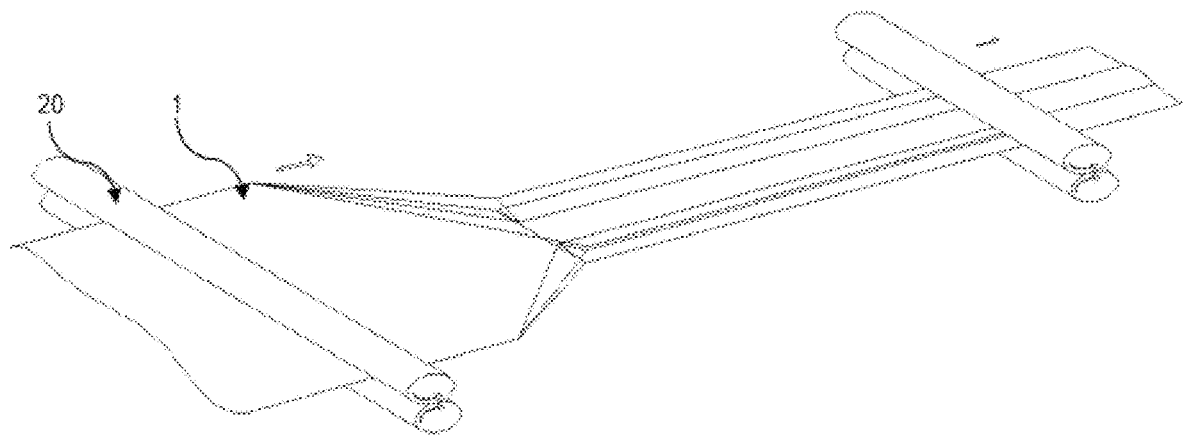
FIG. 2 is a schematic diagram of a process for forming four film materials of a packaging bag by folding a one-piece film material according to an embodiment of the present disclosure.
Figure 3:
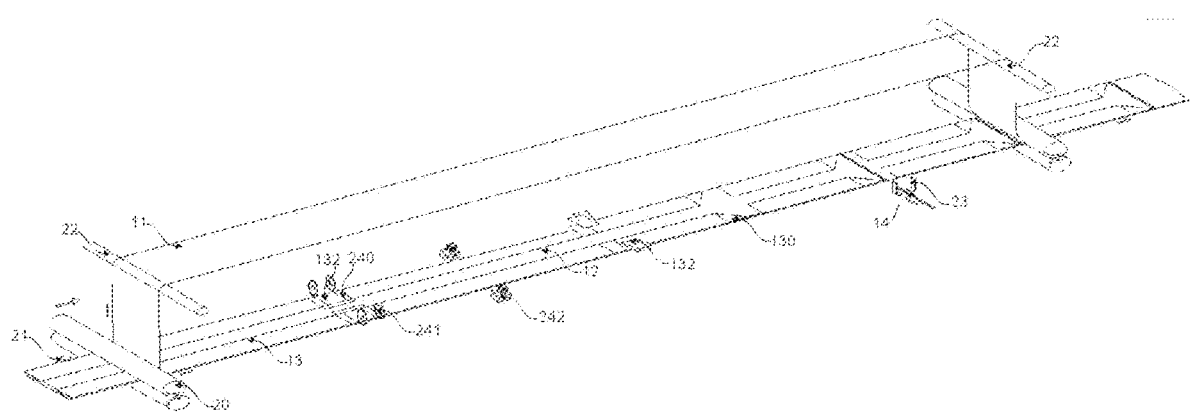
FIG. 3 is a schematic diagram of preparing a four side seal packaging bag with triangle structure side accordions according to Embodiment 1 of the present disclosure.
Figure 4:
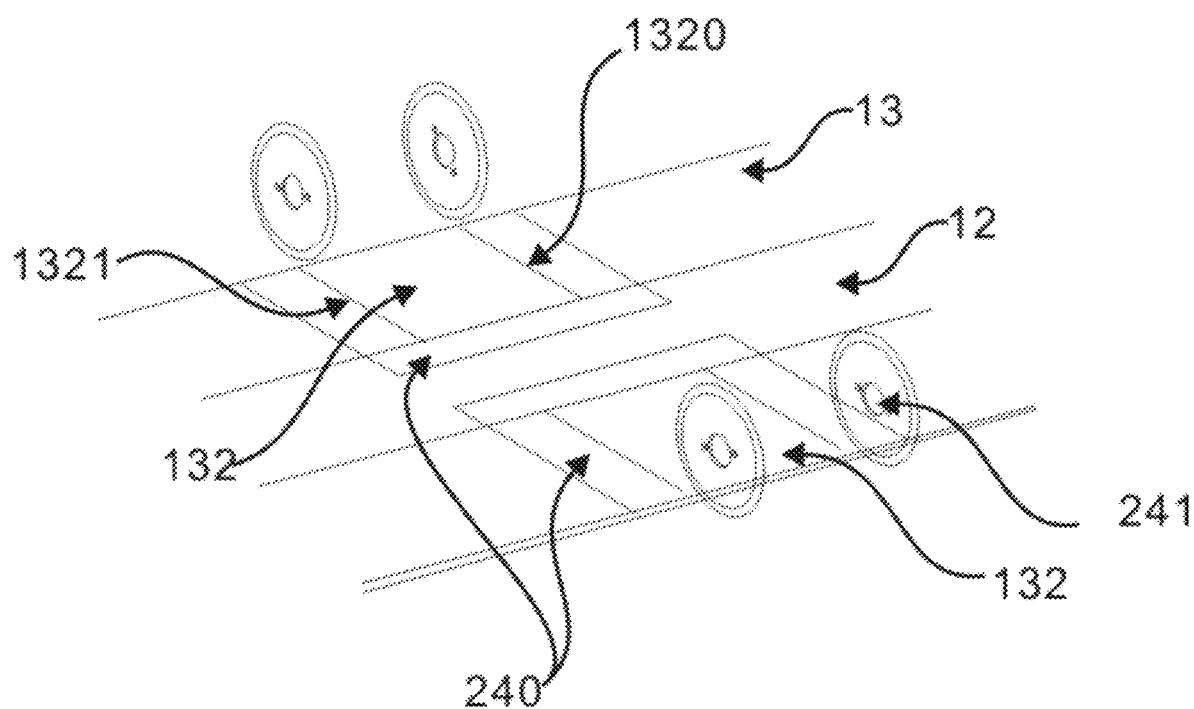
FIG. 4 is a structural diagram of a punch-and-cut station according to Embodiment 1 of the present disclosure.
Figure 5:
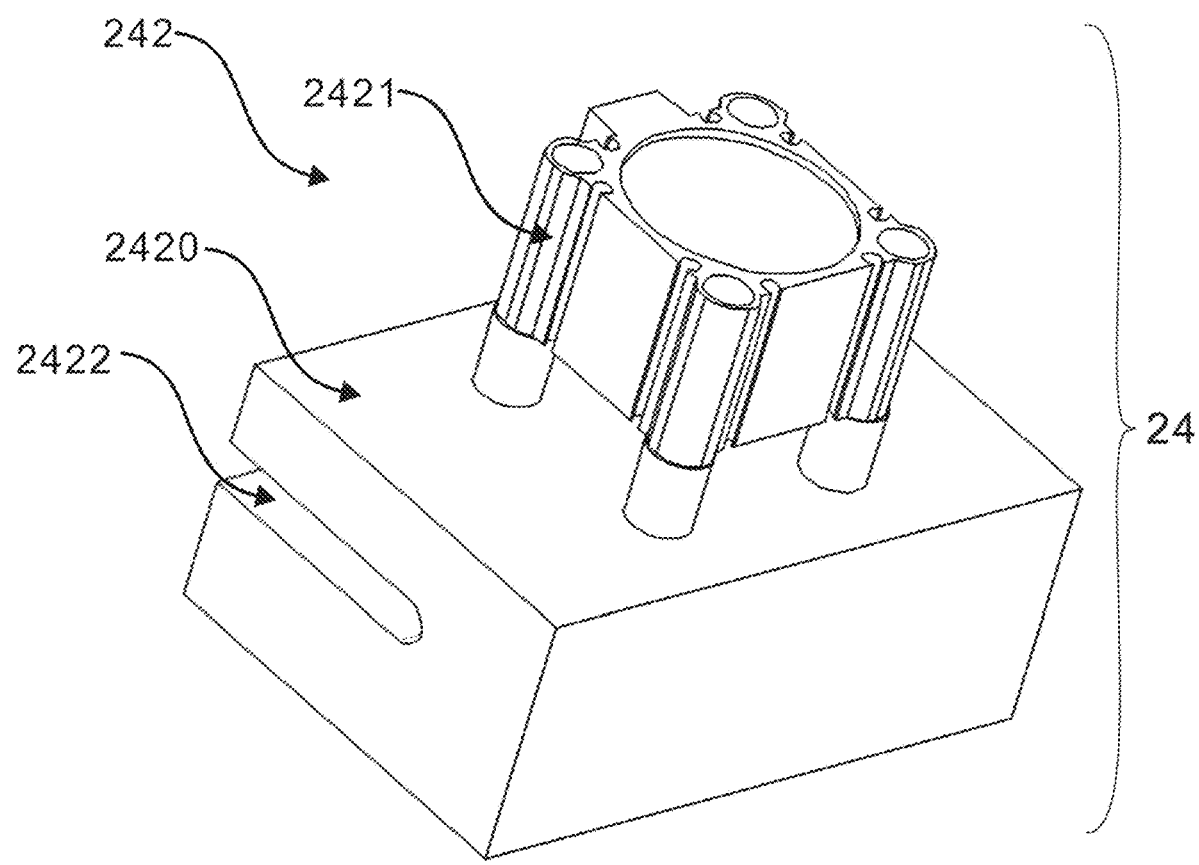
FIG. 5 is a structural diagram of a punching structure according to an embodiment of the present disclosure.
Figure 6:
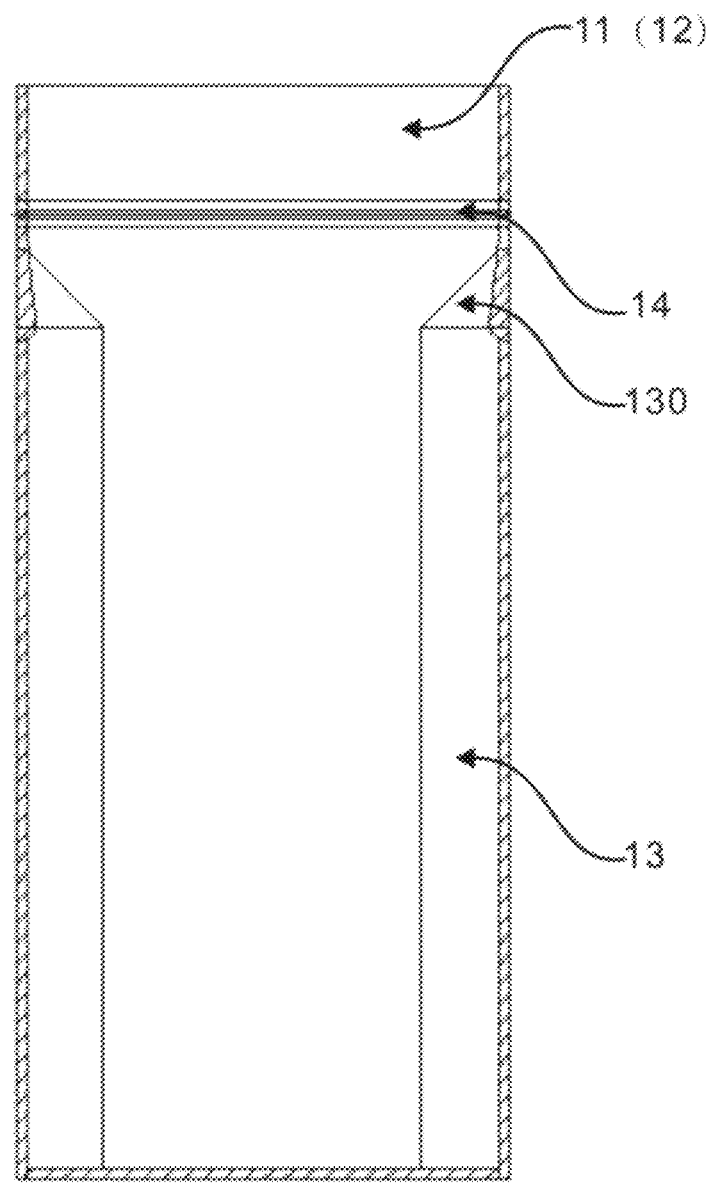
FIG. 6 is a structural diagram of the four side seal packaging bag according to Embodiment 1.

As shown in FIGS. 1 to 6, the present disclosure provides a preparation process for a four side seal packaging bag with triangle structure side accordions. A preparation device of the packaging bag includes at least the following components.

Film material conveying mechanism 20 is configured to continuously convey film material 1 of packaging bag 10 along a length direction of the film material 1. The film material conveying mechanism 20 is the same as an existing film material conveying mechanism of a bag making machine, and includes at least conveying rubber rollers for continuous conveyance of the film material 1 of the packaging bag.

A folding mechanism is configured to fold the film material 1 conveyed by the film material conveying mechanism 20 so as to form upper film material 11, lower film material 12, and two side accordion film materials 13 of the packaging bag 10. The film material 1 folded by the folding mechanism is a one-piece structure. The folding mechanism folds the film material 1 at a side and a center line of the film material 1 upwards along the conveying direction of the film material, and folds the film material back to form two fold angles, thereby forming a side accordion film material 13 part. After the two fold angles are formed at the center line, the folding mechanism is further configured to fold the folded-back film material 1 upwards to cover upper sides of the two side accordion film materials 13, thereby forming the upper film material 11. An unfolded film material 1 part at a bottom forms the lower film material 12. The specific structural form of the folding mechanism can refer to the folding mechanism provided by the applicant in the technical solution of the Chinese patent application CN110435218B, or other folding mechanisms can be used, as long as the film material can be folded to form upper film material, the lower film material, and the side accordion film materials.

Cutting mechanism 21 is located at two sides of the film material 1 of the packaging bag, and is configured to cut the upper film material 11 formed by folding by the folding mechanism, along creases, so as to separate the upper film material 11 from the lower film material 12 and the side accordion film materials 13. In terms of specific structure, the cutting mechanism 21 includes at least a cutting blade and a blade drive mechanism. The cutting blade can be a sheet-like blade or blades in other forms that can cut the film material. The blade drive mechanism can be an electric motor, a robotic arm, a cylinder, etc., which is intended to place the cutting blade between the upper film material 11 and the side accordion film materials 13, maintain the stability of the cutting blade, and move the cutting blade out after the cutting is completed.

Guiding mechanism 22 is configured to guide the upper film material 11 cut by the cutting mechanism 21 into another film material conveying mechanism for continuous conveyance in a same direction as the lower film material 12, and guide the upper film material 11 to merge with the lower film material 12 to form the packaging bag 10. In terms of structure, the guiding mechanism 22 includes at least conveying rubber rollers and a roller-to-roller guiding mechanism. The conveying rubber rollers can be existing rubber rollers, and the roller-to-roller guiding mechanism can be a guiding mechanism in an existing film material conveying or distribution and feeding structure.

Punch-and-cut mechanisms 24 are configured to form square punch-and-cut regions 132 on the side accordion film materials 13 separated from the upper film material 11 and separate the square punch-and-cut regions 132 from the side accordion film materials 13. More specifically, there are at least two punch-and-cut mechanisms 24. For example, in this embodiment, there are two punch-and-cut mechanisms. In other embodiments, if the bag making machine is relatively long, multiple punch-and-cut mechanisms can be provided to improve bag making efficiency, and the number of the punch-and-cut mechanisms is a complex number. In this embodiment, the two punch-and-cut mechanisms 24 are symmetrically arranged at the side accordion film materials 13 at two sides of the upper film material 11, to form the square punch-and-cut regions 132 of the two side accordion film materials 13, respectively.

For example, a single punch-and-cut mechanism is specifically described below.

The punch-and-cut targets of the punch-and-cut mechanisms 24 are the side accordion film materials 13, and the side accordion film materials 13 are superposed with the lower film material 12. Therefore, the punch-and-cut mechanism 24 is provided with at least a punch-proof structure, and the punch-proof structure is provided with at least punch-proof pad 240 and a punch-proof pad insertion structure. The punch-proof pad 240 is inserted between the side accordion film material 13 and the lower film material 12 through the punch-proof pad insertion structure, to prevent damage to the lower film material 12 caused when the punch-and-cut mechanism 24 punches and cuts off region 130 of the side accordion film material 13. In this embodiment, the punch-proof pad 240 is a square plate-shaped structure. However, in practical use, it can also be a trapezoidal, triangle structure, etc. Preferably, for the convenience of insertion and punch-proof purposes, at least one edge of the punch-proof pad 240 is aligned with the creases of the side accordion film materials 13 and the lower film material 12 to facilitate punch-proof calibration. In addition, if the punch-proof pad 240 is a non-square structure, it includes at least a square area not less than an area of the square punch-and-cut region 132, such that the square punch-and-cut region 132 can fully cover the punch-proof pad 240 during the punch-and-cut process, ensuring that the punch-and-cut is smooth and does not damage the lower film material 12. The punch-proof pad insertion mechanism is connected to the punch-proof pad 240 and can use a power device such as a robotic arm, a suction cup robotic arm, or a push rod.

The punch-and-cut mechanism 24 is provided with at least a roll-to-cut structure. Each roll-to-cut structure is provided with at least rolling cutters 241 and a rolling cutter drive component. The rolling cutter drive component is connected to the rolling cutters 241 to control roll-to-cut operation of the rolling cutters 241. The rolling cutter 241 is located above the side accordion film material 13, and the rolling cutter 241 rolls to cut off the side accordion film material 13 in a direction perpendicular to the conveying direction of the side accordion film material 13, so as to form punch-and-cut edge A 1320 and punch-and-cut edge B 1321 of the square punch-and-cut region 132. It should be noted that in this solution, although the structures for forming the punch-and-cut edges are called "roll-to-cut structure" and "rolling cutter", it does not mean that only roll-to-cut blade structures belong to the protection scope of this solution. In fact, other blade structures that enter the surface of the side accordion film material in a horizontal or vertical direction to form the punch-and-cut edge also belong to the protection scope of this solution.

In this embodiment, the rolling cutters 241 are circular roll-to-cut blades. There are two rolling cutters configured to form the punch-and-cut edge A 1320 and the punch-and-cut edge B 1321, respectively. In terms of arrangement form, two separate rolling cutters 241 or one integrated double-edged rolling cutter 241 can be used, as long as the two cutting edges are parallel to each other. The width between the two cutting edges depends on the size of the square punch-and-cut region 132 to be cut according to actual needs.

The rolling cutter drive component of the rolling cutters 241 can be a motor, cylinder, etc. with uniform and stable force application.

The punch-and-cut mechanism 24 is provided with at least punching structure 242. The punching structure 242 is located downstream of the roll-to-cut structure and is provided with at least a punching head and punching drive structure 2421. The punching head is connected to the punching drive structure 2421. The punching head punches out and punches and cuts off region 132 with the punch-and-cut edge A 1320 and the punch-and-cut edge B 1321 through the punching drive structure 2421, thereby forming the square punch-and-cut region 132 independent of the side accordion film material.

The punching head is a straight punching head. A length of the punching head is equal to a distance between the punch-and-cut edge A 1320 and the punch-and-cut edge B 1321. During a punching operation, the punching head is located at a connection between the side accordion film material 13 and a side edge of the lower film material 12, as well as above the side accordion film material 13.

In this embodiment, the punching structure 242 is provided with mounting seat 2420. An upper side of the mounting seat 2420 is provided with punching drive structure 2421. The mounting seat 2420 is provided with opening 2422 facing a side of the film material. During the conveyance process, the side accordion film material 13 and the lower film material 12 enter the opening 2422 of the mounting seat 2420 for positioning. The punching head is located above the opening 2422. After the square punch-and-cut region 132 of the side accordion film material 13 is positioned, the punching head above the opening 2422 is driven by the punching drive structure 2421 to punch, thereby completely separating the square punch-and-cut region 132 from the side accordion film material 13.

In this embodiment, the punching drive structure 2421 uses cylinder drive or motor drive.

The punch-and-cut mechanism 24 is provided with at least a gripping structure. The gripping structure is located downstream of the punching structure 242 and is provided with at least a gripping end and a gripping end drive structure. The gripping end is driven by the gripping end drive structure to grip the square punch-and-cut region 132 punched and cut by the punching head. The gripping structure can be a suction cup, a robotic arm, or other gripping tools.

A side accordion forming mechanism is configured to perform a forming operation on the side accordion film materials 13 after the square punch-and-cut region 132 is separated by the punch-and-cut mechanism 24. In this embodiment, the side accordion forming mechanism includes an angle folding mechanism. The angle folding mechanism is located at two sides of the conveying direction of the film material 1, and is configured to fold a side of the cut side accordion film material 13 where the punch-and-cut edge B 1321 is formed, along a 45° angle straight line, such that the punch-and-cut edge B 1321 coincides with a side in a length direction of the side accordion after being folded and right-angled triangle 130 is formed at one end of the cut side accordion film material 13.

Hot-sealing mechanism 23 is configured to hot-seal the upper film material 11, the formed side accordion film materials 13, and the lower film material 12 to form the four side seal packaging bag 10. The hot-sealing mechanism 23 adopts a hot-sealing mechanism of the existing bag making machine. Therefore, the hot-sealing mechanism is a prior art, and will not be further elaborated herein.

A zipper conveying mechanism is configured to convey zipper 14 to a position between the lower film material 12 and the upper film material 11.

In practical operation, based on the complex process of the bag making machine, other devices used for preparing the four side seal packaging bag, such as the control device and the motor drive device are routine devices for preparing packaging bags, and will not be elaborated herein.

Based on the above preparation device, this embodiment further provides a preparation method of the four side seal packaging bag 10. The preparation method is implemented by the preparation device of the four side seal packaging bag 10, and specifically includes the following steps.

Step 1. The film material 1 of the packaging bag is continuously conveyed by the film material conveying mechanism 20 along the length direction of the film material 1.

Step 2. The folding mechanism folds the film material 1 conveyed by the film material conveying mechanism 20. The film material folded by the folding mechanism is a one-piece structure. The folding mechanism folds a side and a center line of the film material upwards along the conveying direction to form two fold angles, thereby forming the side accordion film material 13 part. After the two fold angles are formed at the center line, the folded film material is folded upwards to cover the upper sides of the two side accordion film 13, thereby forming the upper film material 11. An unfolded film material part at the bottom forms the lower film material 12. In this way, a basic structure of the four side seal packaging bag 10 is formed.

Step 3. The cutting mechanism 21 cuts the upper film material 11 formed by folding by the folding mechanism along creases, such that the upper film material 11 is separated from the lower film material 12 and the side accordion film materials 13.

Step 4. The guiding mechanism 22 guides the upper film material 11 cut by the cutting mechanism 21 into another film material conveying mechanism for continuous conveyance in the same direction as the lower film material 12.

Step 5. The punch-and-cut mechanism 24 punches and cuts off region 132 on the side accordion film material 13 separated from the upper film material 11, and separates the square punch-and-cut region 132 from the side accordion film material 13. The specific punching steps are as follows.

Step 5a. When the side accordion film material 13 enters a station for forming the square punch-and-cut region 132, the punch-proof pad 240 insertion structure of the punch-proof structure inserts the punch-proof pad between the side accordion film material 13 and the lower film material 12, so as to prevent damage to the lower film material 12 when the square punch-and-cut region 132 of the side accordion film material 13 is punched and cut off.

Step 5b. After the placement of the punch-proof pad 240 is finished in the step 5a, the rolling cutter drive component of the roll-to-cut structure is started to drive the rolling cutter 241 to process the side accordion film material 13 above the punch-proof pad 240, thereby forming the punch-and-cut edge A 1320 and the punch-and-cut edge B 1321 of the square punch-and-cut region 132.

Step 5c. After the punch-and-cut edge A 1320 and the punch-and-cut edge B 1321 are formed in the step 5b, the side accordion film material 13 is conveyed to a punching station. The punching drive structure of the punching structure 242 drives the punching head to punch and cut off the square punch-and-cut region 132 with punch-and-cut edges A 1320 and B 1321, thereby forming the square punch-and-cut region 132 independent of the side accordion film material.

Step 5d. After the square punch-and-cut region 132 is punched and cut off in the step 5c, the side accordion film material 13 is conveyed to a gripping station. The gripping end drive structure of the gripping structure drives the gripping end to grip the punched and cut square punch-and-cut region 132 to a waste disposal site for centralized recycling and processing.

Step 6. The side accordion forming mechanism performs a forming operation on the side accordion film material 13 after the square punch-and-cut region 132 is separated. The side accordion film material 13 separated from the square punch-and-cut region 132 is folded along the 45° angle straight line of the punch-and-cut edge B 1321, such that the punch-and-cut edge B 1321 coincides with side edge in the length direction of the side accordion after being folded, and a right-angled triangle is formed at one end of the side accordion film material 13.

Step 7. The zipper conveying device conveys the zipper to the lower film material 12 after the side accordion is formed. The zipper 14 is located in a zone of the lower film material corresponding to the original square punch-and-cut region 132 and above the triangle formed after the side accordion is formed.

Step 8. The guiding mechanism 22 guides the upper film material 11 with an upper side of the lower film material 12.

Step 9. The hot-sealing mechanism 23 seals the upper film material 11, the formed side accordion film materials 13, and the lower film material 12 to form the four side seal packaging bag 10.

The four side seal packaging bag 10 prepared by the above preparation device and method includes at least the upper film material 11, the lower film material 12, and the two side accordion film materials 13 located between the upper film material 11 and the lower film material 12. The zipper 14 is located above the side accordion film materials 13 between the upper film material 11 and the lower film material 12. The triangle 130 structure is formed at a side of the side accordion film material 13 located at an opening of the packaging bag 10. An overlap part between the triangle structure and an edge of the side accordion film material 13 is hot-pressed by spot heating, and the zipper 14 is located above the triangle 130 structure of the side accordion film material.

Embodiment 2

Figure 7:
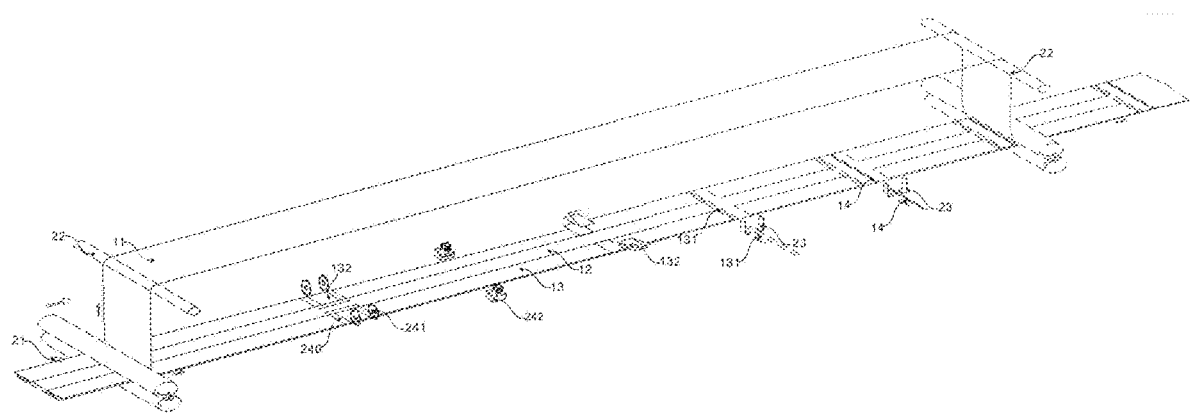
FIG. 7 is a schematic diagram of preparing a four side seal packaging bag with seal strip structure side accordions according to Embodiment 2 of the present disclosure.
Figure 8:
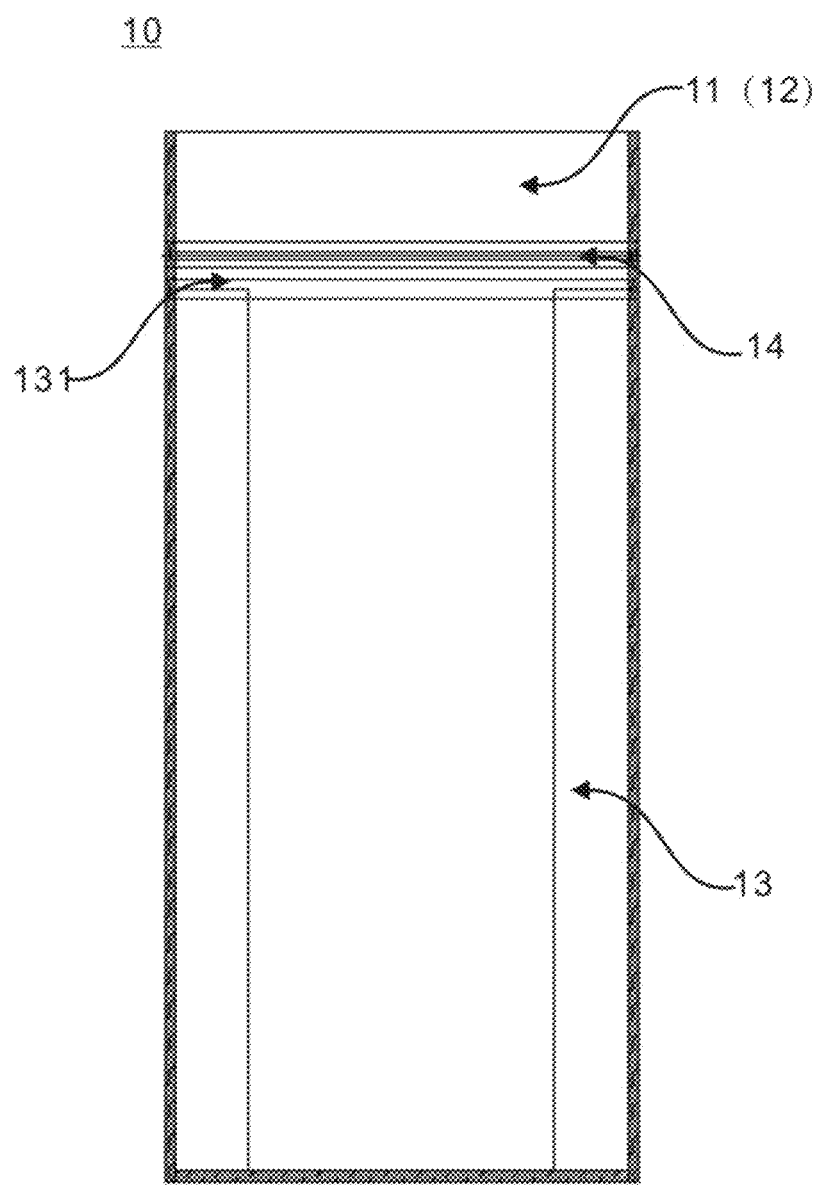
FIG. 8 is a structural diagram of the four side seal packaging bag according to Embodiment 2.

FIGS. 1, 2, 4, 5, 7, and 8 illustrate another embodiment of the technical solution. The difference between this embodiment and Embodiment 1 is as follows.

In terms of preparation device, the side accordion forming mechanism includes at least a seal strip 131 conveying mechanism and the hot-sealing mechanism 23. After the square punch-and-cut region 132 is separated, the seal strip 131 conveying mechanism feeds seal strip 131 to the side accordion film material 13 along a direction perpendicular to the conveying direction of the film material to cover the punch-and-cut edge B 1321. The hot-sealing mechanism 23 hot-presses the seal strip 131 against the side accordion film material 13.

In terms of preparation method, the side accordion molding process in the step 6 includes at least the following steps. After the square punch-and-cut region 132 is separated, the seal strip 131 conveying mechanism feeds the seal strip 131 to the side accordion film material 13 along a direction perpendicular to the conveying direction of the film material to cover the punch-and-cut edge B 1321. The hot-sealing mechanism 23 hot-presses the seal strip 131 against the side accordion film material 13. The zipper 14 conveyed by the zipper 14 conveying mechanism is located in a zone of the lower film material 12 corresponding to the original square punch-and-cut region 132 and above the seal strip 131 hot-pressed by the side accordion forming mechanism.

The four side seal packaging bag structure formed based on the above difference includes at least the upper film material 11, the lower film material 12, and the two side accordion film materials 13 located between the upper film material 11 and the lower film material 12. The zipper 14 is located above the side accordion film materials 13 between the upper film material 11 and the lower film material 12. The side accordion film material 13 is a square structure where the seal strip 131 structure is hot-pressed.

It should be noted that unless otherwise defined, the technical and scientific terms used in the claims and the specification are as they are usually understood by those skilled in the art to which the present disclosure pertains. In the specification and claims of the present disclosure, terms such as "connected to" and "connected with" are not restricted to physical or mechanical connections, but may include direct and indirect electrical connections. Terms such as "upper", "lower", "end", and "side", are used only to indicate a relative positional relationship, and when the absolute position of the described object is changed, the relative positional relationship is also changed accordingly.

Those skilled in the art may easily think of other implementation solutions of the present disclosure after considering the specification and practicing the content disclosed herein. The present application is intended to cover any variations, uses, or adaptive changes of the present disclosure. These variations, uses, or adaptive changes follow the general principles of the present disclosure and include common knowledge or conventional technical means in the technical field that are not disclosed by the present disclosure. The specification and the embodiments are to be regarded as examples only, and the true scope and spirit of the present disclosure are pointed out by the claims.

It should be understood that the present disclosure is not limited to the precise structure that has been described above and shown in the accompanying drawings, and various modifications and changes can be made without departing from its scope. The scope of the present disclosure is defined only by the appended claims.

What is claimed is:

1. A preparation device of a four side seal packaging bag, comprising:
   a film material conveying mechanism, configured to continuously convey a film material of a packaging bag along a length direction of the film material;
   a folding mechanism, comprising folding guides, configured to fold the film material conveyed by the film material conveying mechanism to form an upper film material, a lower film material, and two side accordion film materials of the packaging bag, wherein a structure of the four side seal packaging bag is formed;
   a cutting mechanism, configured to cut the upper film material formed by folding by the folding mechanism, along creases, to separate the upper film material from the lower film material and the side accordion film materials;
   punch-and-cut mechanisms, configured to form square punch-and-cut regions on the side accordion film materials separated from the upper film material and separate the square punch-and-cut regions from the side accordion film materials;
   a side accordion forming mechanism, configured to perform a further forming operation on the side accordion film materials after the square punch-and-cut regions are separated by the punch-and-cut mechanism; and
   a hot-sealing mechanism, configured to hot-seal the upper film material, the formed side accordion film materials, and the lower film material to form the four side seal packaging bag;
   wherein the punch-and-cut mechanisms each are provided with a punch-proof structure; the punch-proof structure is provided with a punch-proof pad and a punch-proof pad insertion structure; and the punch-proof pad is inserted between the side accordion film material and the lower film material through the punch-proof pad insertion structure, to prevent damage to the lower film material caused when the punch-and-cut mechanism punches and cuts off the square punch-and-cut region of the side accordion film material;
   the punch-and-cut mechanisms each are provided with a roll-to-cut structure; the roll-to-cut structure is provided with rolling cutters and a rolling cutter drive component; the rolling cutter drive component is connected to the rolling cutters to control roll-to-cut operation of the rolling cutters; the rolling cutters are located above the side accordion film material; and the rolling cutters roll-to-cut the side accordion film material in a direction perpendicular to a conveying direction of the side accordion film material to form punch-and-cut edges of the square punch-and-cut region;
   the punch-and-cut mechanisms each are provided with a punching structure; the punching structure is located downstream of the roll-to-cut structure and is provided with at least a punching head and a punching drive structure; and the punching head is configured to punch and cut off the square punch-and-cut region with the punch-and-cut edges through the punching drive structure, wherein the square punch-and-cut region is formed; and
   the punch-and-cut mechanisms each are provided with a gripping structure; the gripping structure is located downstream of the punching structure and is provided with a gripping end and a gripping end drive structure; and the gripping end is driven by the gripping end drive structure to grip the square punch-and-cut region punched and cut by the punching head.

2. The preparation device of the four side seal packaging bag according to claim 1, wherein the film material folded by the folding mechanism is a one-piece structure; and the folding mechanism is configured to: fold the film material at a side and a center line of the film material upwards along a conveying direction of the film material; fold the film material back to form two fold angles, wherein the side accordion film materials are formed; and fold, after two fold angles are formed at the center line, the folded-back film material upwards to cover upper sides of the two side accordion film materials, wherein the upper film material is formed, wherein an unfolded film material part at a bottom forms the lower film material.

3. The preparation device of the four side seal packaging bag according to claim 1, wherein there are at least two punch-and-cut mechanisms.

4. The preparation device of the four side seal packaging bag according to claim 1, wherein the punching head is a straight punching head; a length of the punching head is equal to a distance between the two punch-and-cut edges of the square punch-and-cut region; and during a punching operation, the punching head is located at a connection between the side accordion film material and a side edge of the lower film material, as well as above the side accordion film material.

5. The preparation device of the four side seal packaging bag according to claim 1, wherein the side accordion forming mechanism comprises an angle folding mechanism; and the angle folding mechanism is located at two sides of the conveying direction of the film material, and is configured to fold, after the square punch-and-cut region is separated, the side accordion film material along a 45° angle straight line of the punch-and-cut edge, wherein the punch-and-cut edge coincides with a side in a length direction of the side accordion after being folded and a right-angled triangle is formed at the side accordion film material; or
   the side accordion forming mechanism comprises at least a seal strip conveying mechanism and the hot-sealing mechanism; the seal strip conveying mechanism is configured to feed, after the square punch-and-cut region is separated, a seal strip to the side accordion film material along a direction perpendicular to the conveying direction of the film material to cover the punch-and-cut edge; and the hot-sealing mechanism is configured to hot-press the seal strip against the side accordion film material; and
   the side accordion forming mechanism is provided with either of the angle folding mechanism and the seal strip conveying mechanism.

6. The preparation device of the four side seal packaging bag according to claim 5, further comprising a zipper conveying mechanism for conveying a zipper to a position between the lower film material and the upper film material, wherein the zipper conveyed by the zipper conveying mechanism is located in a zone of the lower film material corresponding to the square punch-and-cut region and above the triangle formed by the side accordion forming mechanism or the hot-pressed seal strip.

7. The preparation device of the four side seal packaging bag according to claim 1, further comprising a guiding mechanism, wherein the guiding mechanism is located downstream of the cutting mechanism, and is configured to guide the upper film material cut by the cutting mechanism into another film material conveying mechanism for continuous conveyance in a same direction as the lower film material, and guide the upper film material to merge with the lower film material during final forming of the packaging bag.

8. A preparation method of a four side seal packaging bag, implemented by the preparation device of the four side seal packaging bag according to claim 1, and comprising the following steps:
- step 1: continuously conveying, by the film material conveying mechanism, the film material of the packaging bag along the length direction of the film material;
- step 2: folding, by the folding mechanism, the film material conveyed by the film material conveying mechanism to form the upper film material, the lower film material, and the two side accordion film materials, wherein the structure of the four side seal packaging bag is formed;
- step 3: cutting, by the cutting mechanism, the upper film material formed by folding by the folding mechanism along the creases, wherein the upper film material is separated from the lower film material and the side accordion film materials;
- step 4: guiding, by a guiding mechanism, the upper film material cut by the cutting mechanism into another film material conveying mechanism for continuous conveyance in the same direction as the lower film material;
- step 5: forming, by the punch-and-cut mechanisms, the square punch-and-cut regions on the side accordion film materials separated from the upper film material, and separating the square punch-and-cut regions from the side accordion film materials;
- step 6: performing, the further forming operation on the side accordion film materials after the square punch-and-cut regions are separated;
- step 7: guiding, by the guiding mechanism, the upper film material above the lower film material; and
- step 8: hot-sealing, by the hot-sealing mechanism, the upper film material, the formed side accordion film materials, and the lower film material to form the four side seal packaging bag.

9. The preparation method of the four side seal packaging bag according to claim 8, wherein in the step 5, the square punch-and-cut region is formed by at least:
- step 5a: when the side accordion film material enters a station for forming the square punch-and-cut region: inserting, by the punch-proof pad insertion structure of the punch-proof structure, the punch-proof pad between the side accordion film material and the lower film material to prevent the damage to the lower film material when the square punch-and-cut region of the side accordion film material is punched and cut off;
- step 5b: after the placement of the punch-proof pad is finished in the step 5a: starting the rolling cutter drive component of the roll-to-cut structure, and driving the rolling cutters to process the side accordion film material above the punch-proof pad, wherein the punch-and-cut edges of the square punch-and-cut region are formed;
- step 5c: after the punch-and-cut edges are formed in the step 5b: conveying the side accordion film material to a punching station; driving, by the punching drive structure of the punching structure, the punching head to punch and cut off the square punch-and-cut region with the punch-and-cut edges, wherein the square punch-and-cut region is formed; and
- step 5d: after the square punch-and-cut region is punched and cut off in the step 5c: conveying the side accordion film material to a gripping station; driving, by the gripping end drive structure of the gripping structure, the gripping end to grip the punched and cut square punch-and-cut region to a waste disposal site for centralized recycling and processing.

10. The preparation method of the four side seal packaging bag according to claim 8, wherein
- in the step 6, the further forming of the side accordion comprises at least: folding, after the square punch-and-cut region is separated, the side accordion film material along a 45° angle straight line of the punch-and-cut edge, wherein the punch-and-cut edge coincides with a side in a length direction of the side accordion after being folded and a triangle is formed at one end of the side accordion film material; or
- in the step 6, the further forming of the side accordion comprises at least: feeding, by a seal strip conveying mechanism after the square punch-and-cut region is separated, a seal strip to the side accordion film material along a direction perpendicular to the conveying direction of the film material to cover the punch-and-cut edge; and hot-pressing, by the hot-sealing mechanism, the seal strip against the side accordion film material;
- wherein either of the angle folding step and the seal strip conveying step is performed.

11. The preparation method of the four side seal packaging bag according to claim 8, wherein before guiding the upper film material to merge with the lower film material in the step 7 after the forming of the side accordion film material in the step 6, the preparation method further comprises a zipper mounting step: conveying, by a zipper conveying mechanism, the zipper to the lower film material.

12. The preparation method according to claim 8, wherein in the preparation device, the film material folded by the folding mechanism is a one-piece structure; and the folding mechanism is configured to: fold the film material at a side and a center line of the film material upwards along a conveying direction of the film material; fold the film material back to form two fold angles, wherein the side accordion film materials are formed; and fold, after two fold angles are formed at the center line, the folded-back film material upwards to cover upper sides of the two side accordion film materials, wherein the upper film material is formed, wherein an unfolded film material part at a bottom forms the lower film material.

13. The preparation method according to claim 8, wherein in the preparation device, there are at least two punch-and-cut mechanisms.

14. The preparation method according to claim 8, wherein in the preparation device, the punching head is a straight punching head; a length of the punching head is equal to a distance between the two punch-and-cut edges of the square punch-and-cut region; and during a punching operation, the punching head is located at a connection between the side accordion film material and a side edge of the lower film material, as well as above the side accordion film material.

15. The preparation method according to claim 8, wherein in the preparation device, the side accordion forming mechanism comprises an angle folding mechanism; and the angle folding mechanism is located at two sides of the conveying direction of the film material, and is configured to fold, after the square punch-and-cut region is separated, the side accordion film material along a 45° angle straight line of the punch-and-cut edge, wherein the punch-and-cut edge coincides with a side in a length direction of the side accordion after being folded and a right-angled triangle is formed at the side accordion film material; or the side accordion forming mechanism comprises at least a seal strip conveying mechanism and the hot-sealing mechanism; the seal strip conveying mechanism is configured to feed, after the square punch-and-cut region is separated, a seal strip to the side accordion film material along a direction perpendicular to the conveying direction of the film material to cover the punch-and-cut edge; and the hot-sealing mechanism is configured to hot-press the seal strip against the side accordion film material; and the side accordion forming mechanism is provided with either of the angle folding mechanism and the seal strip conveying mechanism.

16. The preparation method according to claim 15, wherein the preparation device further comprises a zipper conveying mechanism for conveying a zipper to a position between the lower film material and the upper film material, wherein the zipper conveyed by the zipper conveying mechanism is located in a zone of the lower film material corresponding to the original-square punch-and-cut region and above the triangle formed by the side accordion forming mechanism or the hot-pressed seal strip.

17. The preparation method according to claim 8, wherein the preparation device further comprises the guiding mechanism, wherein the guiding mechanism is located downstream of the cutting mechanism, and is configured to guide the upper film material cut by the cutting mechanism into another film material conveying mechanism for the continuous conveyance in the same direction as the lower film material, and guide the upper film material to merge with the lower film material during final forming of the packaging bag.

* * * * *